July 30, 1957    H. KIETZ    2,801,403
MEASURING RAILROAD TUNNELS BY ECHO SOUNDING
Filed April 13, 1953    3 Sheets-Sheet 1

Inventor
HANS KIETZ
By Bryant & Lowry
Attorneys

July 30, 1957 H. KIETZ 2,801,403
MEASURING RAILROAD TUNNELS BY ECHO SOUNDING
Filed April 13, 1953 3 Sheets-Sheet 2

Inventor
HANS KIETZ
By Bryant & Lowry
Attorneys

INVENTOR
HANS KIETZ

United States Patent Office 2,801,403
Patented July 30, 1957

2,801,403

MEASURING RAILROAD TUNNELS BY ECHO SOUNDING

Hans Kietz, Bremen, Germany, assignor to Atlas-Werke Aktiengesellschaft, Bremen, Germany Application April 13, 1953, Serial No. 348,387

Claims priority, application Germany April 15, 1952

15 Claims. (Cl. 340—1)

This invention relates to echo sounding, and more particularly to ascertaining transverse distances in long and narrow passages, especially railroad tunnels and the like, by emitting impulses of supersonic wave energy from a test car. For maintaining the safety of traffic through mountain tunnels it is important frequently to survey the profile of the tunnel in order to detect and keep under control displacements of the tunnel walls caused by rock pressure. Mechanical methods employed hitherto for surveying the tunnel profile are rather time-consuming. The present invention allows ascertaining the position of the tunnel walls in relation to the rails without actual contact.

Sounding apparatus used in sea water for determining automatically the depth of the sea beneath a ship and recording the bottom profile along the course of the ship as a graph on a recording chart are known. For measuring smaller distances such as the transverse dimensions of railroad tunnels mechanical methods have been employed hitherto; most likely because it had not been thought possible to meet the high requirements on measuring accuracy by means of other range finders. Experiments conducted by the inventor, however, have proved that it is feasible to determine the distance to a tunnel wall with sufficient accuracy by means of an echo sounder mounted upon a railroad car passing through the tunnel, provided supersonic waves having a frequency of 100,000 cycles per sec. are used.

One of the principal objects of the present invention is to provide an efficient method of controlling the wall clearance in railroad tunnels in relation to the track and a standard car profile, or of measuring other long and narrow rooms, the transverse sections of which must not deviate from a standard. According to this method the distances to the wall which depend on the transverse profile, are measured by an echo sounder mounted on a test car and various longitudinal contour lines are successively or simultaneously recorded.

The velocity of sound in air being about one-fifth the velocity of sound in water, sufficient accuracy is obtained in spite of the small distances involved, so that such a tunnel can be measured with the same percentage of accuracy by means of sound impulses as an artificial water channel can by means of an echo sounder. One object of this invention is to provide ultrasonic equipment on a railroad car for directionally emitting and receiving pulses of ultrasonic energy and recording the time of travel of a pulse from an emitting transducer to a point of the tunnel wall and back to a receiving transducer adjacent to the emitting transducer. Another object of the invention is recording transversal distances of the walls of a railroad tunnel in certain directions from points being in known positional relationships to the track.

Another object of the invention is ultrasonic equipment on a railroad car incorporating several transducer pairs arranged for echo-ranging in different directions in a plane transverse to the axis of a railroad tunnel, thereby enabling to record several longitudinal contour lines of the tunnel walls while the car is run through the tunnel.

A further object of this invention is providing a pair of associated transmitting and receiving transducers adjustably mounted on a railroad car for echo ranging in various directions within the transversal plane of a tunnel.

A still further object of the invention is ultrasonic ranging equipment on a railroad car adapted to recording longitudinal contour lines of a tunnel wall on a moving chart, the advance mechanism of which is geared to a wheel axle of the car.

Another object of the invention is to provide apparatus for carrying the above mentioned method into effect, which apparatus comprises a test car, sound impulse transmitting means and echo receiving means provided on said test car and adapted directionally to transmit and receive supersonic impulses for determining profile lines, amplifiers electrically connected with the receiving means and adapted to increase the power level of the reflected supersonic impulses, and recording means adapted to visibly record said supersonic impulses.

Various other objects and advantages of this invention will be more apparent upon considering the following detailed description of a typical embodiment thereof illustrated schematically in the accompanying drawings in which.

Figure 1:
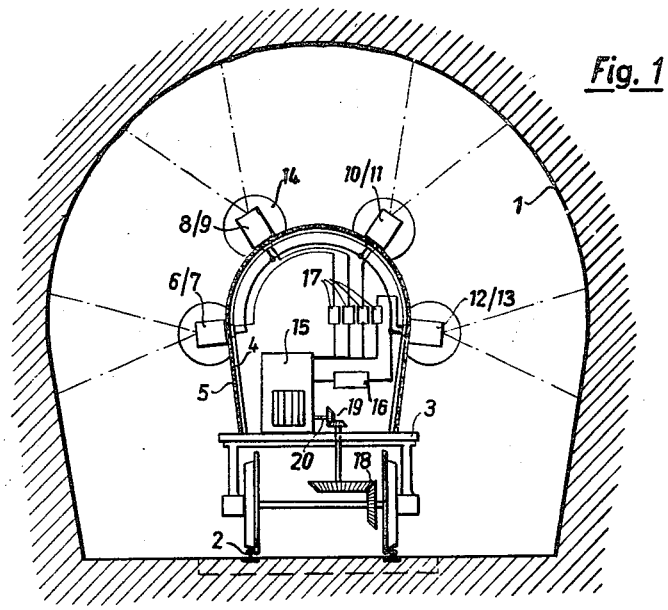
Fig. 1 shows in front elevation, partly in section, an echo sounding apparatus on a test car in a railroad tunnel.
Figure 2:
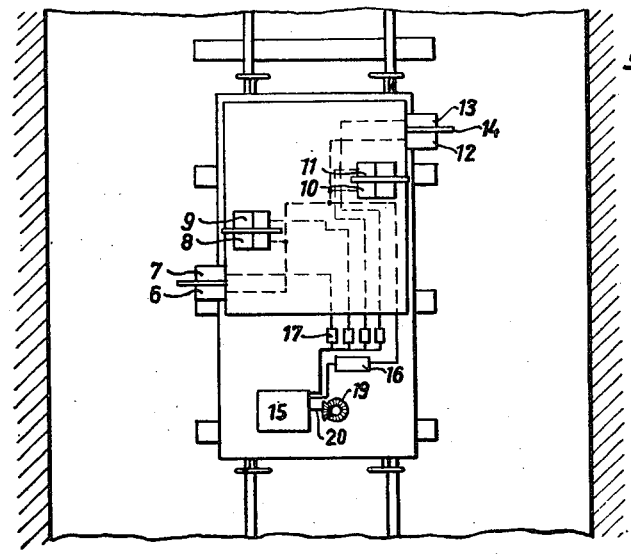
Fig. 2 is a top plan view thereof.

The echo sounding apparatus illustrated in Figs. 1 and 2 in a tunnel 1 comprises a test car 3 on rails 2, the test car being provided with an arched structure 4 covered by a sound-absorbing fabric 5, four magneto-strictive supersonic impulse transmitters 6, 8, 10, and 12, and four magneto-strictive supersonic impulse receivers 7, 9, 11, and 13 secured to the arched structure 4. The transmitters and receivers have a directional pattern the main lobe of which is vertical to tunnel wall 1. Sound screens 14 are provided between transmitters and receivers to prevent the receivers from being directly excited by the transmitters. In order to prevent mutual disturbing effects of the various transmitter and receiver pairs these pairs are staggered longitudinally, as shown in Fig. 2.

A recording mechanism 15 is electrically connected to a pulse generator 16 associated with the impulse transmitters 6, 8, 10, and 12, and to four amplifiers 17 for the impulses caught by the receivers 7, 9, 11, and 13. A shaft 20 in engagement with the paper feed is driven by a wheel axle of test car 3 by means of gearing 18 and 19.

Figure 3:
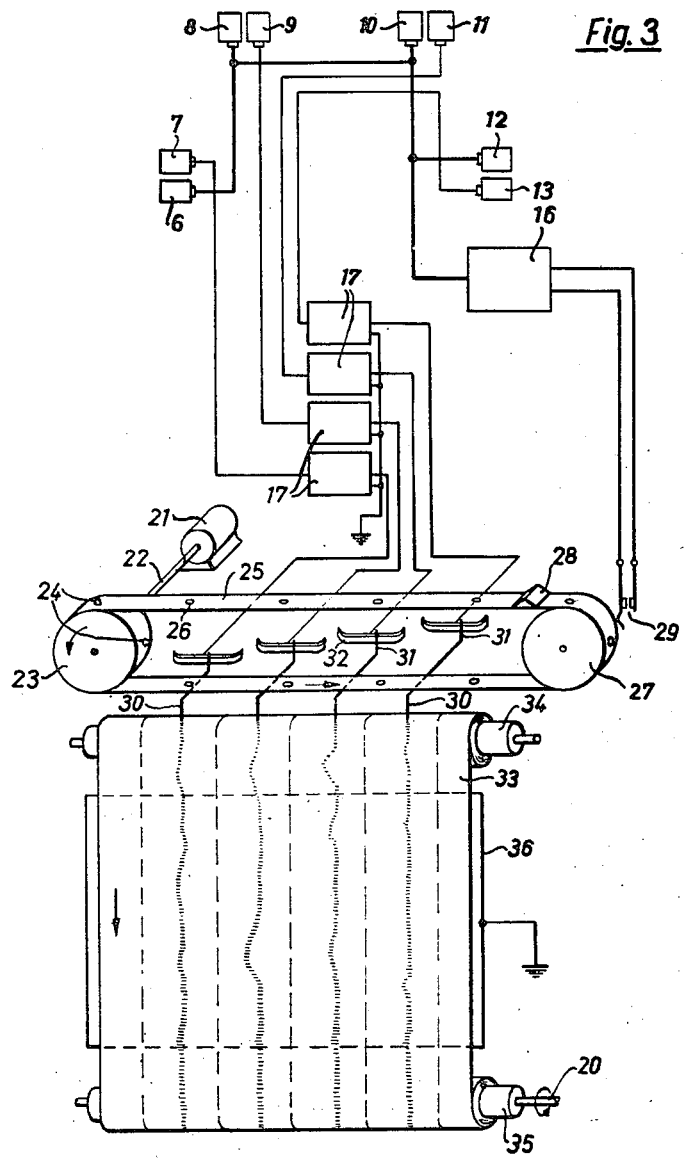
Fig. 3 shows a wiring diagram thereof.

As illustrated in Fig. 3, a motor 21 by means of a shaft 22 drives a roller 23 provided with spikes 24 upon its circumference, at uniform speed, the spikes 24 engaging holes 26 of an endless belt 25. Another roller 27 is provided to guide the belt. A cam 28 is provided upon the belt and adapted to operate a keying contact 29 during the revolution of the belt thereby causing a supersonic impulse to be emitted by the pulse generator 16. Belt 25, in addition, is provided with four styli 30 connected to sliding contacts 31. These contacts slide over stationary contact rails 32 having a length of one-fourth the paper width and which are connected to receivers 7, 9, 11, and 13 by means of amplifiers 17. Contacts 31 move on parallel lines, and the stationary contact rails 32 are arranged along these lines in such a manner that each of the sliding contacts can engage only one of the stationary contact rails 32. The four styli 30 are in contact with an electrosensitive recording chart 33 which unwinds from a cylinder 34 and is rewound on a cylinder 35 after passing over a platen 36. Platen 36 is grounded the same as an output terminal of each amplifier. Cylinder 35 is driven by a wheel axle of the test car by means of shaft 20.

When keying contact 29 is closed by the cam 28, all transmitting apparatus simultaneously emit directed impulses having a frequency of 100,000 cycles per sec. which after being reflected from the various sections of the tunnel wall are received by the receiving apparatus and recorded on the chart 33 by the styli 30. The position of the recordings on the chart indictaes the measured distances.

The distances of the respective transmitting and receiving apparatus from the tunnel wall are about the same and the arrangement of the cam 28 and of the styli 30 on the belt relative to each other is such that the impulses on the average arrive when each stylus is in the middle of its recording range. The recordings can be compared with reference lines on the recording chart which are in accord with the standard tunnel profile. It is also possible to have recordings made at different times on different charts later to be superposed optically and compared in order to find out movements of the tunnel wall.

The test car can pass through the tunnel to be measured with a speed up to 10 miles per hour. Soundings are taken at intervals of $\frac{1}{10}$ second so that the tunnel wall is substantially continuously scanned. The chart feed is adjusted to such a speed that the individual recordings are just separately discernible. By employing a greater number of transmitters and receivers a larger portion of the wall profiles may be subjected to scanning.

From the above detailed description of the invention, it is believed that the construction and operation will at once be apparent, and while there is herein shown and described a preferred embodiment of the invention, it is nevertheless to be understood that minor changes may be made therein without departing from the spirit and scope of the invention as claimed.

For instance, the sounding apparatus may be such that during each passage through the tunnel only one or two longitudinal contour lines are recorded so that for obtaining sufficient information the tunnel would have to be passed through several times by the test car, the sounding directions being altered each time.

Figure 4:
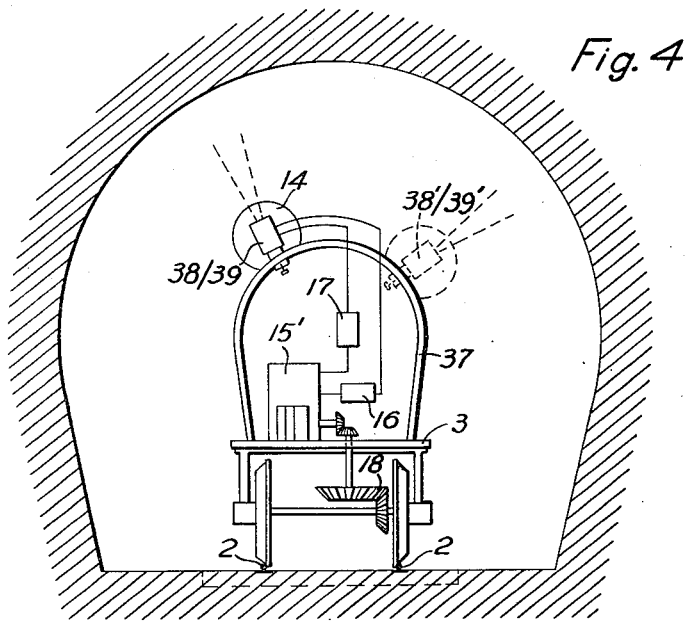
Fig. 4 shows in front elevation a simplified version of the echo sounding apparatus shown in Figs. 1 and 2.
Figure 5:
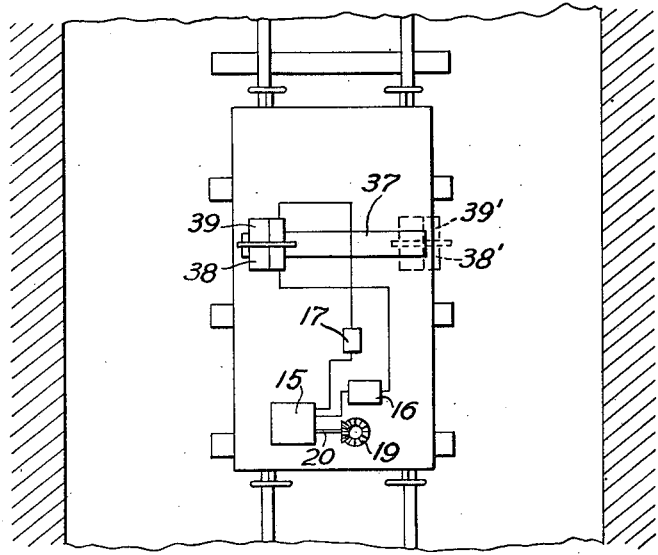
Fig. 5 is a top plan view thereof.

An apparatus of this kind is shown in Figs. 4 and 5 wherein parts corresponding to parts which have already been described in connection with Figs. 1 and 2, are designated by the same numerals. A bar-shaped arched member 37, similar to the arched structure 4 shown in Figs. 1 and 2, is provided on the test car. An impulse transmitter 38 and an associated echo receiver 39 are slidably and adjustably mounted on the arched member 37. By displacing the transmitter and receiver along the arched member 37 to positions 38'—39', the sounding beam may be adjusted to any desired direction in the transverse plane of the tunnel.

Moreover, with a transversal scanning movement of the sound beam, transverse profiles could be recorded instead of longitudinal contour lines. This, however, will involve a greater consumption of recording chart when the transverse profiles are recorded in their normal form. In order to reduce this paper consumption the transverse profiles may be recorded according to the Cartesian co-ordinate system instead according to polar co-ordinates so that they appear as nearly straight lines extending across the chart.

In recording transverse profiles the test car will preferably be stopped during the measuring process and moved on by a short distance between recordings.

Instead of several directionally-focussed transmitters a single non-directive transmitter may be provided.

In order to define more exactly the portion of the wall the distance of which is measured, the receivers and/or transmitters may be provided with guide tubes for the impulses, the mouths of which having not more than the necessary clearance from the wall.

If the ultra sonic ranging apparatus is operating in such a way that the transmission of impulses in the various directions does not take place simultaneously but successively each transmitter is keyed by a separate contact and a single amplifier connected to the receivers in parallel and a single stylus connected to the output of the amplifier will suffice for recording. In such a case measurements made on different portions of the wall profile may be arranged to take place at such time intervals that at a predetermined speed of the test car the measurements made in different directions will be grouped in series with distances lying in a common transverse plane.

Separate ultrasonic ranging and recording apparatus may be provided for different transverse directions in which case synchronous driving means will be used for the recorders and the paper feed mechanisms thereof.

I claim:

1. An echo sounding apparatus for measuring long and narrow passages, particularly railroad tunnels and the like, comprising in combination a test car for movable support on tracks of a tunnel, sound impulse transmitting means and echo receiving means supported on said test car and adapted directionally to transmit and receive in a plurality of transverse directions supersonic impulses for determining longitudinal contour lines, amplifiers electrically connected to the receiving means and adapted to increase the power level of the reflected supersonic impulses, and recording means adapted to visibly record said supersonic impulses, said recording means comprising a paper roll driven by an axle of said car.

2. An echo sounding apparatus for measuring long and narrow passages, particularly railroad tunnels and the like, comprising in combination a test car for movable support on tracks of a tunnel, sound impulse transmitting means and echo receiving means supported on said test car across the running direction thereof and adapted to transmit and receive in a plurality of transverse directions supersonic impulses for determining longitudinal contour lines simultaneously, amplifiers electrically connected to the receiving means and adapted to increase the power level of the received supersonic impulses, and recording means being controlled by said amplifiers and adapted to visibly record said supersonic impulses.

3. An echo sounding apparatus for measuring long and narrow passages, particularly railroad tunnels and the like, comprising in combination a test car for movable support on tracks of a tunnel, sound impulse transmitting means and echo receiving means supported on said test car transverse to its running direction and adapted to transmit and receive in a plurality of transverse directions several supersonic impulses for determining longitudinal contour lines successively, amplifiers electrically connected to the receiving means and adapted to increase the power level of the received supersonic impulses, and recording means being controlled by said amplifiers and adapted to visibly record said supersonic impulses, said recording means comprising a paper roll driven by an axle of said car.

4. An echo sounding apparatus for measuring long and narrow passages, particularly railroad tunnels and the like, as claimed in claim 1, wherein a common control device is provided adapted to operate several sound transmitters simultaneously.

5. An echo sounding apparatus for measuring long and narrow passages, particularly railroad tunnels and the like as claimed in claim 1, wherein a common control device is provided adapted to operate several sound transmitters successively.

6. An echo sounding apparatus for measuring long and narrow passages, particularly railroad tunnels and the like as claimed in claim 1, wherein a common chart is provided adapted for having recorded thereupon at a certain distance from each other, the longitudinal contour lines.

7. An echo sounding apparatus for measuring long and narrow passages, particularly railroad tunnels and the like as claimed in claim 1, wherein means are provided to have the distance covered by the test car recorded in synchronism with the recording of contour lines.

8. An echo sounding apparatus for measuring long and narrow passages, particularly railroad tunnels and the like as claimed in claim 1, wherein means are provided for controlling the advance of the recording chart by the speed of the test car.

9. An echo sounding apparatus for measuring long and narrow passages, particularly railroad tunnels and the like as claimed in claim 1, wherein only one impulse transmitter and an associated echo receiver are provided which are adjustable for sounding in any of a plurality of sounding directions in a transverse plane of the passage.

10. An echo sounding apparatus for measuring long and narrow passages, particularly railroad tunnels and the like as claimed in claim 1, wherein several pairs of transducers are disposed along the length of the test car and adapted to transmit and receive ultrasonic pulses in different directions in planes substantially perpendicular to the axis of the tunnel.

11. An echo sounding apparatus for measuring long and narrow passages, particularly railroad tunnels and the like as claimed in claim 1, wherein pulses are emitted in different directions at such time intervals corresponding to the running speed of the car that sets of measurements in different directions are obtained, with each set associated to a single transverse portion of the tunnel.

12. An echo sounding apparatus for measuring long and narrow passages, particularly railroad tunnels and the like as claimed in claim 1, wherein pulses are emitted simultaneously in all the different directions provided.

13. An echo sounding apparatus for measuring the transverse profile of the surface of a vehicular tunnel having fixed tracks, comprising a test car running on said tracks, a plurality of sets of sound impulses transmitting means and echo receiving means mounted in operative relation to said surface, each set being oriented to transmit and receive in a different direction in a plane substantially perpendicular to the axis of the tunnel, means for simultaneously pulsing all of said sets, and a plurality of spaced recording styli simultaneously movable across a recording surface, each stylus being associated with a different one of said receiving means to produce a mark on said recording surface when a pulse is received by the associated receiver.

14. The invention according to claim 13, and means for moving said recording surface at a rate corresponding to the motion of said car.

15. The invention according to claim 14, and means for periodically repeating simultaneous pulsing of said sets.

References Cited in the file of this patent

UNITED STATES PATENTS

| | | |
|---|---|---|
| 2,596,023 | Goble et al. | May 6, 1952 |
| 2,631,270 | Goble | Mar. 10, 1953 |

OTHER REFERENCES

Shaw: "Echo Depth Sounder for Shallow Water," Electronics, September 1946 issue, pages 88–91.